K. M. STAHL.
MICROSCOPE.
APPLICATION FILED MAR. 27, 1909. RENEWED AUG. 19, 1911.
1,022,606.
Patented Apr. 9, 1912.
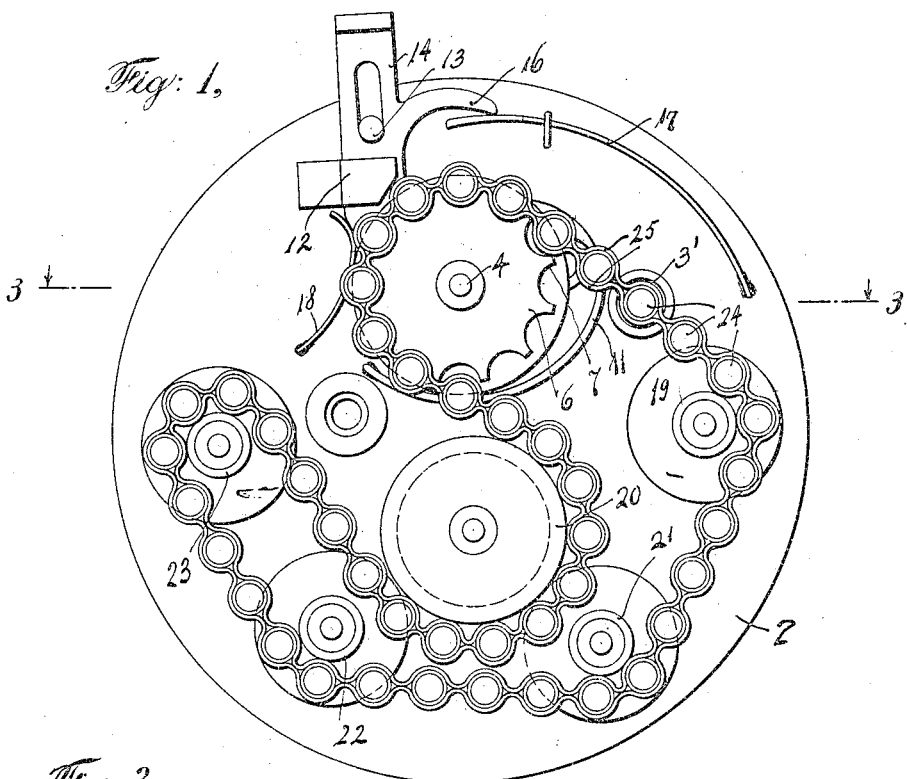
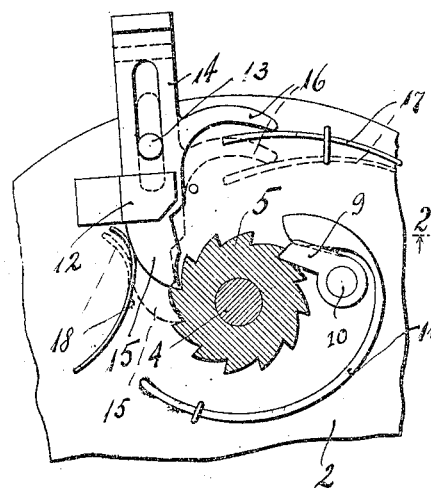
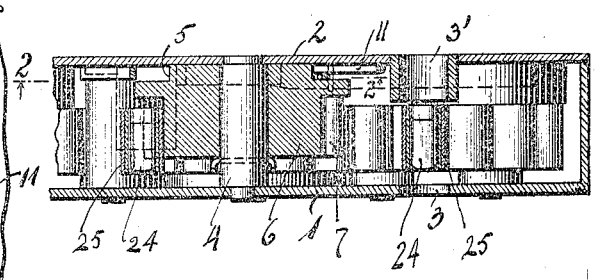
Witnesses.
M. Gautner.
J. Luttinger.
Inventor
Karl M. Stahl
By his Attorney
Max D. Ordmann

UNITED STATES PATENT OFFICE.

KARL M. STAHL, OF NEW YORK, N. Y.

MICROSCOPE.

1,022,606.   Specification of Letters Patent.   Patented Apr. 9, 1912.

Application filed March 27, 1909, Serial No. 486,225. Renewed August 19, 1911. Serial No. 645,013.

*To all whom it may concern:*

Be it known that I, KARL M. STAHL, citizen of the United States, residing at New York, in the county of New York and State of New York, have invented certain new and useful Improvements in Microscopes, of which the following is a specification.

The present invention relates to an improvement on microscopes and particularly of the kind with which a series of microscopic views are successively and intermittently brought to be displayed before the sight opening of the microscope.

The object of my invention is to construct a microscope in which the lenses themselves bear the microscopic views and are attached to a continuous or endless band which is suitably guided in the casing, the band being so connected with the feeding mechanism that by the depression of an outwardly projecting part the band will be fed.

Another object of my invention is to so mount the band in the microscope casing as to allow of its being readily removed therefrom and replaced by a band containing a different series of views.

A further object of my invention is to make the mechanism very simple and cheap.

To make my invention more clear the same is illustrated in the accompanying drawing, in which—

Figure 1 is an inner view of the microscope, the face disk being removed; Fig. 2 is a section on line 2—2 of Fig. 3 showing the feeding mechanism, and Fig. 3 is a cross section on line 3—3 of Fig. 1.

In the drawing 1 denotes the casing and 2 the removable face disk or cover. The face walls of the casing and the cover are provided with opposite perforations 3 and 3', the opening 3 serving for the penetration of light and 3' as the sight opening. Borne in the said face walls of the casing and cover is a spindle 4 which carries a ratchet wheel 5 and a disk 6 having on its circumference semicylindrical grooves 7. The wheel 5 and the disk 6 may be rigidly connected or integral with one another and are both solid on the spindle 4. A dog 9 pivoted at 10 to the inner surface of the cover and actuated by a spring 11 constantly engages with the teeth of the ratchet wheel, and thereby tends to retain the wheel in its position. Guided through a recess in the circumference of the casing 1 and between the face disk 2 and a piece 12 upon a pin 13 is a slotted bar 14, the inner end of which is formed as a pawl 15 adapted to engage the teeth of the ratchet wheel 5, and upon the depression of the bar to feed the said wheel. The bar has a lateral projection 16 which constantly rests on a spring 17 tending to return the bar to its outer position. Another spring 18 presses the lower portion of the bar constantly in engagement with the teeth of the ratchet wheel.

Mounted on spindles parallel to the spindle 4 are idle rollers 19, 20, 21, 22 and 23 which are to serve as guides for the band carrying the lenses, which will now be described.

The lenses 24 are pin shaped or cylindrical bodies which are placed between two flexible and endless bands 25 at short distances apart from one another. The bands are sewn or otherwise attached together to form pockets in which the lenses may be tightly held in position. One end of these lenses bears the view which may be photographed or otherwise produced thereon. The width of the band conforms substantially with the length of the lenses and also with the length of the grooves in the disk 7, such that the cylindrical bodies of the lenses may engage and be propelled by the latter when the disk is being fed. The band is guided around the disk 6 and the guide rollers 19, 20, 21, 22, 23, as shown in Fig. 1, so that in feeding the band, the lenses are caused to pass between the two perforations 3 and 3' in the casing, displaying the views through the sight opening 3'.

The distance between the individual lenses is so calculated that by the depression of the bar 14, the disk is fed a fraction of a revolution and a new lens is brought into register with the openings 3, 3'.

It is clear that some modifications may be made without deviating from the spirit of my invention.

What I claim and desire to secure by Letters Patent is:—

1. In a microscope of the kind described, the combination with a grooved wheel, of an endless carrier composed of two flexible strips sewed together at intervals to form pockets between themselves, pin shaped view bearing lenses mounted in said pockets and forming corrugations, whereby the carrier engaging the grooved wheel is caused to be fed.

2. In a microscope of the kind specified, the combination with a grooved wheel of an endless carrier composed of two flexible strips sewed together at intervals to form pockets between themselves, pin shaped view bearing lenses mounted in said pockets forming corrugations, whereby the carrier engaging the grooved wheel is fed and means for feeding said wheel.

3. In a microscope of the kind specified, the combination with a grooved wheel of an endless carrier composed of two flexible strips sewed together at intervals to form pockets between themselves, pin shaped view bearing lenses mounted in said pockets forming corrugations whereby the carrier engaging the grooved wheel is fed, a ratchet wheel connected with the grooved wheel and a spring actuated, movable bar the lower end of which is formed as a pawl engaging the ratchet wheel and serving for feeding the grooved wheel.

In testimony whereof I affix my signature in presence of two witnesses.

KARL M. STAHL.

Witnesses:
JOSEPH E. CAVANAUGH,
MAX D. ORDMANN